(12) United States Patent
Tanaka

(10) Patent No.: US 12,030,286 B2
(45) Date of Patent: Jul. 9, 2024

(54) GAS BARRIER LAMINATE AND PACKAGING BAG

(71) Applicant: TOPPAN INC., Tokyo (JP)

(72) Inventor: Ayumi Tanaka, Tokyo (JP)

(73) Assignee: TOPPAN INC., Tokyo (JP)

( * ) Notice: Subject to any disclaimer, the term of this patent is extended or adjusted under 35 U.S.C. 154(b) by 39 days.

(21) Appl. No.: 17/967,031

(22) Filed: Oct. 17, 2022

(65) Prior Publication Data

US 2023/0047527 A1    Feb. 16, 2023

Related U.S. Application Data

(63) Continuation of application No. PCT/JP2021/016517, filed on Apr. 23, 2021.

(30) Foreign Application Priority Data

Apr. 27, 2020    (JP) .................. 2020-078164

(51) Int. Cl.
| | | |
|---|---|---|
| *B32B 27/08* | (2006.01) | |
| *B32B 1/08* | (2006.01) | |
| *B32B 7/12* | (2006.01) | |
| *B32B 27/32* | (2006.01) | |
| *B65D 65/40* | (2006.01) | |

(52) U.S. Cl.
CPC ............... *B32B 27/08* (2013.01); *B32B 1/08* (2013.01); *B32B 7/12* (2013.01); *B32B 27/32* (2013.01); *B65D 65/40* (2013.01); *B32B 2255/10* (2013.01); *B32B 2255/20* (2013.01); *B32B 2264/1021* (2020.08); *B32B 2307/7244* (2013.01); *B32B 2439/46* (2013.01)

(58) Field of Classification Search
None
See application file for complete search history.

(56) References Cited

U.S. PATENT DOCUMENTS

| | | | |
|---|---|---|---|
| 2018/0009206 A1 | 1/2018 | Murase et al. | |
| 2020/0047960 A1* | 2/2020 | Kono | C23C 16/12 |
| 2020/0230915 A1* | 7/2020 | Kurokawa | H01L 33/505 |

FOREIGN PATENT DOCUMENTS

| | | |
|---|---|---|
| JP | 2006-062115 A | 3/2006 |
| JP | 3949551 B2 | 7/2007 |
| JP | 2018-001631 A | 1/2018 |

(Continued)

OTHER PUBLICATIONS

International Searching Authority, "International Search Report," issued in connection with International Patent Application No. PCT/JP2021/016517, dated Jul. 6, 2021.

(Continued)

*Primary Examiner* — James C Yager
*Assistant Examiner* — Thomas J Kessler
(74) *Attorney, Agent, or Firm* — Foley & Lardner LLP

(57) ABSTRACT

A gas barrier laminate (including a substrate layer containing a polyolefin, a metal oxide layer, and a gas barrier cover layer in this order. The gas barrier cover layer contains a silicon alkoxide or a hydrolysate thereof and a water-soluble polymer, and a content ratio a/b between a content of silicon atoms of the silicon alkoxide or a hydrolysate thereof (mass part a) and a content of the water-soluble polymer (mass part b) is 3/97 or more and 45/55 or less in mass ratio.

20 Claims, 4 Drawing Sheets

(56) References Cited

FOREIGN PATENT DOCUMENTS

| JP | 2018-171796 A | 11/2018 | |
| JP | 2019-119132 A | 7/2019 | |
| WO | WO-2016/158794 A1 | 10/2016 | |
| WO | WO-2019069827 A1 * | 4/2019 | ............. B32B 27/08 |

OTHER PUBLICATIONS

International Searching Authority, "Written Opinion," issued in connection with International Patent Application No. PCT/JP2021/016517, dated Jul. 6, 2021.

\* cited by examiner

GAS BARRIER LAMINATE AND PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/016517, filed on Apr. 23, 2021, which in turn claims the benefit of JP 2020-078164, filed Apr. 27, 2020 the disclosures of all which are incorporated herein by reference in its entirety.

TECHNICAL FIELD

The present invention relates to gas barrier laminates and packaging bags.

BACKGROUND

Packaging materials used for packaging foods, pharmaceuticals, or other articles are required to have gas barrier properties to prevent the effects of oxygen, water vapor, or other gases which permeate the packaging materials, from altering the contents.

As packaging materials having gas barrier properties, gas barrier laminates including a deposited inorganic layer or a gas barrier layer containing a water-soluble polymer are generally used.

For example, in PTL 1 shown below, gas barrier properties are developed by forming a thin deposited film layer on a plastic substrate, followed by forming a gas barrier layer thereon. In PTL 2, gas barrier properties are developed by forming a gas barrier layer on a plastic substrate, so that even when a biaxially stretched polypropylene is used, good barrier properties can be developed.

[Citation List] [Patent Literature] PTL 1: JP 2018-1631 A; PTL 2: JP 3949551 B.

SUMMARY OF THE INVENTION

Technical Problem

However, if packaging bags using a substrate containing a polyolefin are subjected to retort sterilization treatment or physical durability tests, there may arise an issue of impairing gas barrier properties.

The present invention has been made in light of the circumstances set forth above and aims to provide a gas barrier laminate exhibiting good gas barrier properties after retort sterilization treatment or physical durability tests even when a substrate containing a polyolefin is used for the gas barrier laminate, and to provide a packaging bag.

Solution to Problem

The present invention provides a gas barrier laminate including a substrate layer containing a polyolefin, a metal oxide layer, and a gas barrier cover layer in this order. In the gas barrier laminate, the gas barrier cover layer contains a silicon alkoxide or a hydrolysate thereof and a water-soluble polymer, and a content ratio a/b between a content of silicon atoms of the silicon alkoxide or a hydrolysate thereof (mass part a) and a content of the water-soluble polymer (mass part b) is 3/97 or more and 45/55 or less in mass ratio.

The content ratio a/b may be 5/95 or more in mass ratio.

The gas barrier laminate may further include an anchor coat layer. In the gas barrier laminate, the metal oxide layer is formed on the substrate layer via the anchor coat layer.

The gas barrier cover layer may have a thickness of 0.1 μm or more and 1 μm or less.

The present invention also provides a packaging bag including the gas barrier laminate described above.

The present invention also provides a tube container including the gas barrier laminate described above.

Advantageous Effects of the Invention

According to the present invention, there can be provided a gas barrier laminate exhibiting good gas barrier properties after retort sterilization treatment or physical durability tests even when a substrate containing a polyolefin is used for the gas barrier laminate, and there can also be provided a packaging bag and a tube container.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

Gas Barrier Laminate

Figure 1:
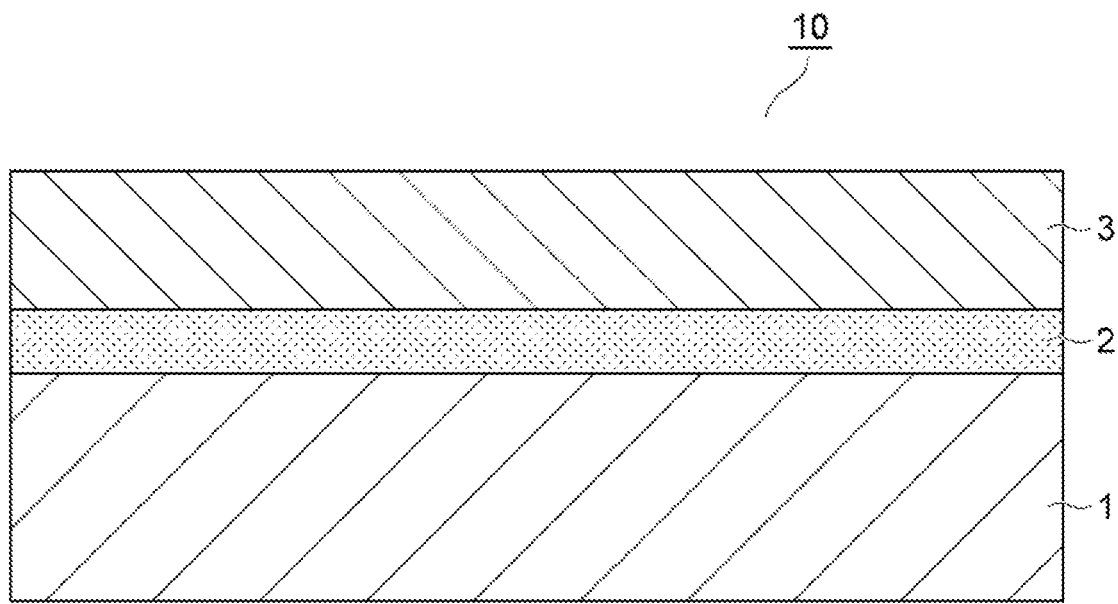
FIG. 1 is a schematic cross-sectional view illustrating a gas barrier laminate according to an embodiment of the present invention.

FIG. 1 is a schematic cross-sectional view illustrating a gas barrier laminate according to an embodiment. A gas barrier laminate 10 according to an embodiment includes a substrate layer 1, a metal oxide layer 2, and a gas barrier cover layer 3 in this order.

Substrate Layer

The substrate layer is a film (base film) serving as a support and contains a polyolefin. The substrate layer may be a film formed of a polyolefin, and may further include a film other than the polyolefin film. Furthermore, the substrate layer may include a multilayer film. The polyolefin may be a stretched film or an unstretched film, but may preferably be a stretched polyolefin, such as, for example, a biaxially stretched polyolefin, and the like. Alternatively, a resin-derived recycled film, such as a polypropylene recycled from industrial waste, may be used.

The thickness of the substrate layer is not particularly limited but the substrate layer may preferably have a typical thickness, for example, of about 3 μm or more and 100 μm or less. If the substrate layer includes a plurality of films, the total thickness may be in the above range.

Figure 2:
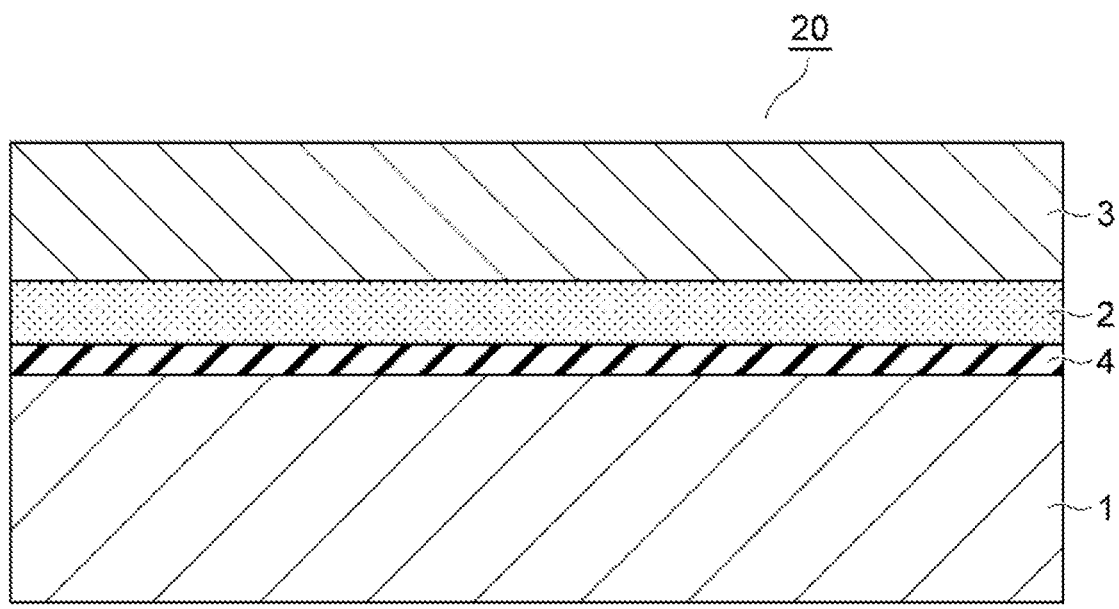
FIG. 2 is a schematic cross-sectional view illustrating a gas barrier laminate according to another embodiment of the present invention.

The substrate may contain additives, as necessary, such as an antistatic agent, UV absorber, plasticizer, and lubricant. Furthermore, the surface of the substrate may undergo modification treatments such as a corona treatment, flame treatment, plasma treatment, or adhesion enhancing treatment, or may be further provided with an anchor coat layer which has undergone these treatments. If an anchor coat layer is also included, the metal oxide layer may be formed on the substrate layer via the anchor coat layer. Specifically, as shown in FIG. 2, a gas barrier laminate according to an embodiment may be a gas barrier laminate 20 including a substrate layer 1, an anchor coat layer 4, a metal oxide layer 2, and a gas barrier cover layer 3 in this order.

Separately, a flattening layer may be provided to reduce asperities of the substrate layer.

Examples of the coating agent for forming the anchor coat layer or flattening layer may include acrylic resins, epoxy resins, acrylic urethane resins, polyester polyurethane resins, and polyether polyurethane resins. Of these coating agents, acrylic urethane resins and polyester polyurethane resins are preferred from the perspective of heat resistance and interlayer adhesion strength.

Metal Oxide Layer

The metal oxide layer contains a metal oxide and may have a structure formed of a single layer or a structure formed of two or more layers. Examples of the material forming the metal oxide layer may include metal oxides such as a silicon oxide, aluminum oxide, magnesium oxide, and tin oxide. From the perspective of barrier properties, the metal oxide may need to be selected from the group consisting of silicon oxide and aluminum oxide. Furthermore, the metal oxide layer may contain nitrogen or aluminum atoms. Using a metal oxide, high barrier properties can be achieved with a considerably thin layer that does not affect recyclability of the gas barrier laminate.

The thickness of the metal oxide layer is preferred to be 3 nm or more and 100 nm or less. If the thickness is 3 nm or more, sufficient gas barrier properties can be achieved. Also, if the thickness is 100 nm or less, the occurrence of cracking can be prevented which would otherwise occur due to increase of cure shrinkage, and can suppress deterioration in gas barrier properties. It should be noted that, if the thickness exceeds 100 nm, the cost may tend to increase due to increase of the amount of the material used, increase of the time required for film formation, and the like, which is not preferable from an economic perspective. From a similar perspective, the thickness of the metal oxide layer is more preferred to be 10 nm or more and 50 nm or less.

The metal oxide layer can be formed by vacuum deposition, for example. In vacuum deposition, a physical vapor deposition method or a chemical vapor deposition method can be used. Examples of the physical vapor deposition method may include, but are not limited to, a vacuum vapor deposition method, sputtering method, ion plating method, and the like. Examples of the chemical vapor deposition method may include, but are not limited to, a thermal CVD method, plasma CVD method, optical CVD method, and the like.

In the vacuum deposition method, a resistance heating vacuum vapor deposition method, electron beam heating vacuum deposition method, inductive heating vacuum vapor deposition method, plasma-enhanced chemical vapor deposition method (PECVD method), or the like is preferably used.

Gas Barrier Cover Layer

The gas barrier cover layer has the effect of protecting the metal oxide layer, and preventing the occurrence of cracking in the metal oxide when deformed. Furthermore, the gas barrier cover layer has gas barrier properties. Provision of the gas barrier cover layer can develop high gas barrier properties in the gas barrier laminate due to the synergistic effect with the metal oxide layer.

The gas barrier cover layer is formed through a step of forming a coating film containing the following components on the surface of the metal oxide layer.

(A) A silicon alkoxide or its hydrolysate (which may be termed Component (A) hereinafter)

(B) A water-soluble Polymer (which may be termed Component (B) hereinafter)

The silicon alkoxide or its hydrolysate (A) and the water-soluble polymer (B) become an organic-inorganic composite by hydrolyzation and dehydration condensation (e.g., sol-gel method). Specifically, the silicon alkoxide (A) forms Si—O bonds due to hydrolyzation and polycondensation reaction, while the silanol group of the hydrolysate of the silicon alkoxide forms a hydrogen bond with the hydroxy group of the water-soluble polymer (B). These reactions are assumed to develop good resistances to hot water and tension in the gas barrier cover layer.

The silicon alkoxide (A) may be a compound expressed by the general formula: Si (OR)n (R: alkyl group such as $CH_3$ or $C_2H_5$), and may be, for example, tetramethoxysilane [$Si(OCH_3)_4$], tetraethoxysilane [$Si(OC_2H_5)_4$], or the like. Furthermore, the hydrolysate of the silicon alkoxide is obtained as a result of hydrolyzation of the above silicon alkoxide, and has a silanol group. Of the above materials, tetraethoxysilane is preferred as a silicon alkoxide because, after hydrolyzation, it is comparatively stable in aqueous solvent.

Examples of the water-soluble polymer (B) may include polyvinyl alcohols or modifications thereof, polyvinyl pyrrolidones, starches, methyl celluloses, carboxymethyl celluloses, sodium alginates, and the like. Of these materials, polyvinyl alcohols (which may be abbreviated as PVAs hereinafter) or modifications thereof are preferred because they can enhance gas barrier properties of the gas barrier cover layer. PVAs referred to herein are generally obtained by saponification of polyvinyl acetates. Examples of PVAs that can be used may include so-called partially saponified PVAs in which several tens percent of the acetic acid group remains, and complete PVAs in which only a few percent of the acetic acid group remains. Furthermore, PVAs in which an ethylene group is introduced to maintain water solubility may be used as modifications of PVAs.

The gas barrier cover layer may be formed from a coating agent that contains Component (A) and Component (B) as materials. For the coating agent, a solvent may be used. Examples of the solvent may include water, alcohol, water/alcohol mixtures, and the like.

The gas barrier cover layer can be formed by preparing a solution that is a mixture of Component (A) or hydrolyzed Component (A) with Component (B), applying the solution to the metal oxide layer, and heating and drying the coating. In this case, the content ratio a/b between a content of the silicon atoms in Component (A) (mass part a) and a content of Component (B) (mass part b) may be 3/97 or more and 45/55 or less in mass ratio. If the content ratio a/b is in the above range, a gas barrier laminate exhibiting good gas barrier properties after retort sterilization treatment or physical durability tests can be obtained even when a substrate containing a polyolefin is used for the gas barrier laminate. In particular, if the ratio a/b is 3/97 or more, water resistance of the layer can be retained, and thus dissolution and delamination of the gas barrier layer can be minimized if a liquid is filled in as contents or if hot water sterilization treatment, such as boiling or retort sterilization treatment, is performed. Also, if the ratio a/b is 45/55 or less, the layer is prevented from becoming excessively hard, and thus flexibility can be secured. From such a perspective, the ratio a/b is more preferred to be 5/95 or more and 23/77 or less.

It should be noted that the content of the silicon atoms in Component (A) (mass part a) is a value obtained by dividing the weight of Component (A) by the molar mass of Component (A), and multiplying this by the mass (atomic weight of 28.1) of the silicon atoms (Si).

The gas barrier cover layer may contain other components than Components (A) and (B) described above as necessary to further improve gas barrier properties. Other components are preferred to be aqueous materials. Examples of other components may include water dispersions of polyacrylic acids, polyurethanes, acrylic resins, and polyester resins; and metal oxides using a metal precursor obtained through a sol-gel method. If these components are to be contained, they may be formulated into the above coating agent.

Also, other materials, such as a leveling agent, antifoamer, UV absorber, antioxidant, silane coupling agent, or metal chelator, may be formulated, as necessary, into the coating agent, for example.

A known method can be used as a method of applying the coating agent in the gas barrier cover layer. Specifically, a wet film formation method, such as gravure coating, dip coating, reverse coating, wire bar coating, or die coating, can be used.

The thickness of the gas barrier cover layer is preferred to be, for example, 0.1 µm or more and 1 µm or less. If the thickness is 0.1 µm or more, the layer is prevented from becoming excessively thin and thus can obtain sufficient gas barrier properties. If the thickness is 1 µm or less, the film is less likely to curl and will have good processing suitability.

The gas barrier laminate has good gas barrier properties which can be exhibited even after retort sterilization treatment or physical durability tests. Specifically, oxygen permeability that can be achieved by the gas barrier laminate at a temperature of 30° C. and a relative humidity of 70% may preferably be, for example, 10 $cc/m^2 \cdot day \cdot atm$ or less, more preferably 5 $cc/m^2 \cdot day \cdot atm$ or less, and even more preferably 3 $cc/m^2$ day·atm or less. Also, oxygen permeability that can be achieved by the gas barrier laminate at a temperature of 121° C. after 30-minute retort sterilization treatment may preferably be, for example, 10 $cc/m^2 \cdot day \cdot atm$ or less, more preferably 5 $cc/m^2$ day·atm or less, and even more preferably 1 $cc/m^2$ day·atm or less. Furthermore, oxygen permeability that can be achieved after performing Gelbo flex tests (physical durability tests) 5 times may preferably be 10 $cc/m^2$ day·atm or less, more preferably 5 $cc/m^2 \cdot day \cdot atm$ or less, and even more preferably 3 $cc/m^2 \cdot day \cdot atm$ or less. In addition, oxygen permeability that can be achieved after performing retort sterilization treatment at a temperature of 121° C. for 30 minutes and after performing Gelbo flex tests (physical durability tests) 5 times may preferably be 11 $cc/m^2 \cdot day \cdot atm$ or less and more preferably 10 $cc/m^2 \cdot day \cdot atm$ or less.

Packaging Bag

A packaging bag according to the present embodiment includes the gas barrier laminate described above. A method of producing a packaging bag includes, specifically, the steps of laminating a sealant layer on a gas barrier cover layer via an adhesive layer to produce a packaging material, and shaping the packaging material into a bag-like form.

The gas barrier laminate has good hot water resistance. Accordingly, by selecting an adhesive layer and a sealant layer having hot water resistance, the packaging material obtained can also have good hot water resistance. Packaging materials having good hot water resistance can be applied to packaging bodies which are subjected to heat sterilization treatment. It should be noted that a stretched or unstretched polypropylene film, for example, may be used as a sealant layer. The thickness of the sealant layer is not particularly limited but may be, for example, 30 µm or more and 100 µm or less.

The adhesive layer adheres between the gas barrier laminate and the sealant layer. Examples of the adhesive forming the adhesive layer may include polyurethane resins each obtained by the action of a bifunctional or higher isocyanate compound on a main resin such as a polyester polyol, polyether polyol, acrylic polyol, or carbonate polyol. The polyols may be used singly or in combination of two or more. For the purpose of promoting adhesion, the adhesive layer may be formed by formulating a carbodiimide compound, oxazoline compound, epoxy compound, phosphorus compound, silane coupling agent, or the like into the polyurethane resins mentioned above. From the perspective of environmental friendliness, the adhesive layer may use biomass-derived polymer components or biodegradable polymer components. The coating amount of the adhesive layer may be, for example, 1 g/m$^2$ to 10 g/m$^2$ from the perspective of achieving desired adhesion strength, followability, processability, and the like.

The packaging bag may be one which is shaped into a bag-like form by folding a single sheet of a packaging material in half so that surfaces of the sealant layer face each other, followed by heat sealing the three sides, or may be one which is shaped into a bag-like form by overlapping two sheets of a packaging material with each other so that the sealant layers face each other, followed by heat sealing the four sides. The packaging bag can accommodate contents, such as foods and pharmaceuticals. Furthermore, the packaging bag may have a shape with bent portions as in standing pouches, and the like. The packaging bag according to the present embodiment can maintain high gas barrier properties even in a shape with bent portions.

Another mode of the packaging bag may be a spouted packaging bag. Structures of the spouted packaging bag may include a structure in which a spout is sandwiched and fixed between two gas barrier laminates forming the packaging bag, or a structure in which a spout plug is adhered and fixed in a hole formed in one surface of the packaging bag. The spout plug can be provided to the top of the packaging bag, or may be provided to a top corner of the packaging bag, or may be provided to the side or the bottom of the packaging bag. If the contents are food in the form of a liquid or a gel, a straw reaching the container bottom may be provided in addition to the spout plug (so-called spout) so that one can suck the contents through the straw by directly putting one's mouth on the spout.

Figure 3:
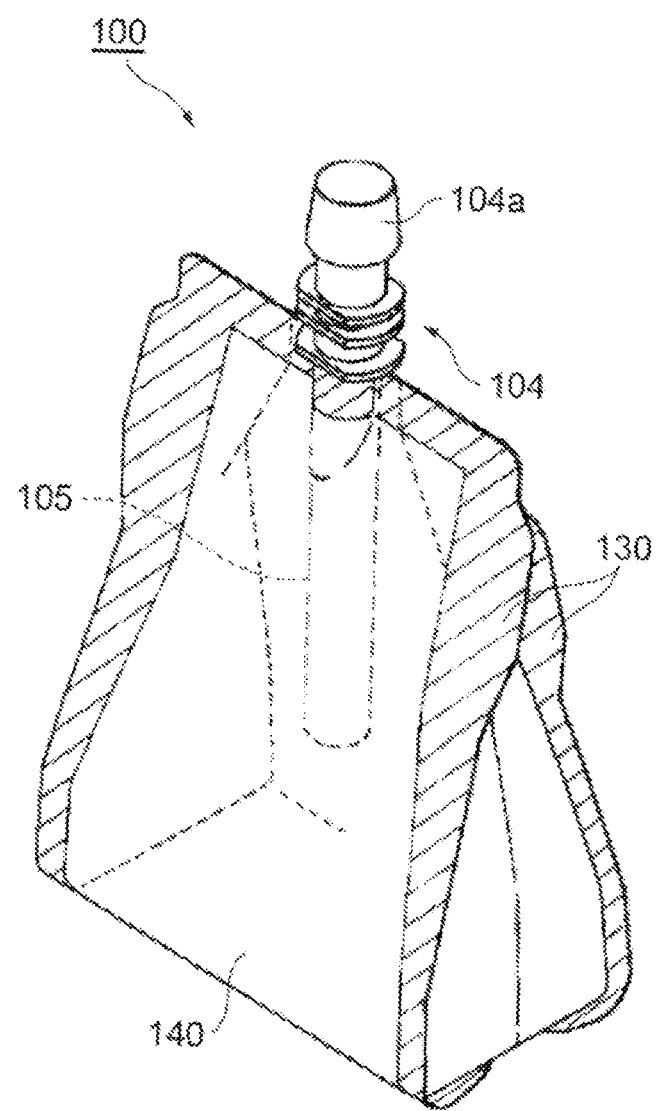
FIG. 3 is a perspective view illustrating an embodiment of a spouted packaging bag.

FIG. 3 is a perspective view illustrating an embodiment of a spouted packaging bag (Gazette bag with spout). A spouted packaging bag 100 shown in FIG. 3 has a structure in which a spout 104 is sandwiched between seal portions 130 of a gas barrier laminate forming a packaging bag 140. The spout 104 is provided with a straw 105 which reaches the bottom of the container. The spouted packaging bag 100 can be sealed by closing a spout cap 104a. The packaging bag 140 forming the spouted packaging bag 100 may be a Gazette bag whose lower part can be spread and bulged when it is filled with contents to stand upright by itself.

Furthermore, the gas barrier laminate of the present embodiment includes a substrate layer containing a polyolefin and a resin layer containing a polyolefin, and therefore, it is soft and retains high gas barrier properties even after being deformed, and thus can be preferably used as a squeeze pouch. The squeeze pouch may be provided with a spout that can be re-sealed, or may have a structure in which the pouch, as a disposable pouch, can be cut to attach a spout thereto.

Another mode of the spouted packaging bag may be a bag—in box that is a carton (outer box) in which a bag (inner bag) containing a liquid such as a soft drink or an alcoholic drink is accommodated. The gas barrier laminate of the present embodiment can be used for the bag accommodated in the bag—in box, and in particular, for a bag body provided with a spout (tube) for discharging the liquid.

It is preferred that all of the spouted packaging bags described above uses a resin, which is the same as the resin used in the substrate layer and the resin layer of the gas barrier laminate, for the spout portion or the entire spout including the cap, from the perspective of improving recyclability.

The gas barrier laminate of the present embodiment can be used for the body of a tube container. Tube containers generally include a body formed of a gas barrier laminate and a discharge portion produced through extrusion. The discharge portion includes a spout portion through which the contents are discharged, and a shoulder portion that guides the contents retained in the body to the spout portion.

Figure 4:
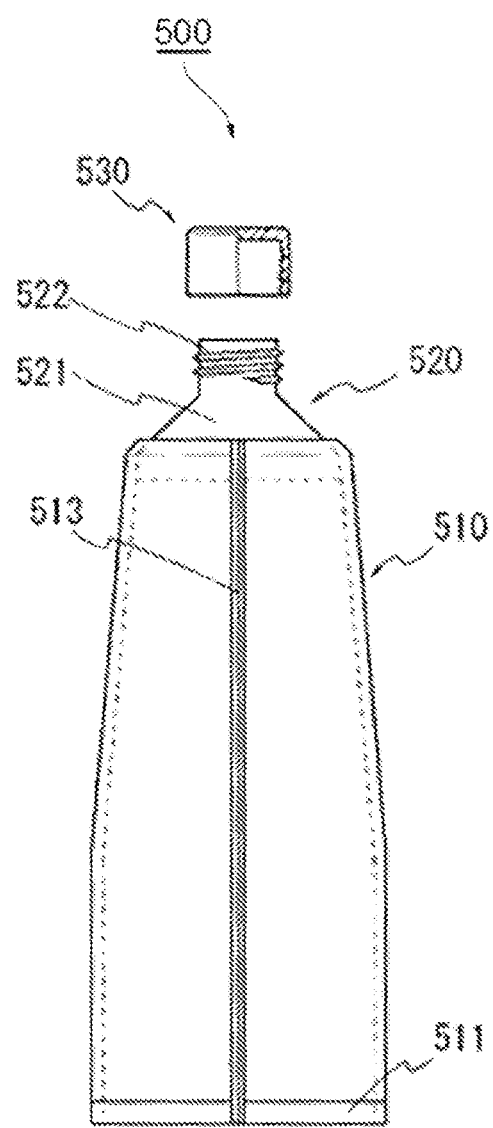
FIG. 4 is a front elevated view illustrating an embodiment of a tube container.

FIG. 4 is a front elevational view illustrating an embodiment of a tube container. A tube container 500 shown in FIG. 4 includes a body 510 formed of a gas barrier laminate, a discharge portion 520 attached to an end of the body 510, and a cap 530 attached to the discharge portion 520. The body 510 is a cylindrical member formed by bonding surfaces of the sealant layer of the gas barrier laminate together at a seal portion 513 and closing a bottom portion 511 at an end which is opposite to the end provided with the discharge portion 520 to accommodate contents therein. The discharge portion 520 includes a spout portion 522 through which the contents are discharged, and a shoulder portion 521 which guides the contents retained in the body 510 to the spout portion 522. The cap 530 is a member which can close and open the opening of the spout portion 522.

The gas barrier laminate of the present embodiment, which has gas barrier properties and can retain them at a high level even after being deformed, is suitable for use as a body of the tube container mentioned above which is repeatedly deformed when the contents are squeezed out. A laminate tube, which is a type of a tube container, may have a body of a layer structure including, for example, a first resin layer (sealant layer) as an innermost layer, adhesive layer, gas barrier cover layer, metal oxide layer, anchor coat layer, substrate layer, adhesive layer, and second resin layer (sealant layer) in this order, or including a second resin layer (sealant layer) as an innermost layer, adhesive layer, substrate layer, anchor coat layer, metal oxide layer, gas barrier cover layer, adhesive layer, and first resin layer (sealant layer) in this order. A print layer may be provided on the surface of the second resin layer and bonded to the substrate via the adhesive layer, or may be provided on the surface of the first resin layer and bonded to the gas barrier cover layer-formed surface of the substrate via the adhesive layer. Alternatively, as a body of the tube container, the first or second resin layer as the outermost layer does not have to serve as a sealant layer, but may serve as a resin layer similar to the substrate layer not aiming heat sealing, while surfaces of the sealant layer as an innermost layer may be placed face-to-face and bonded together at the ends (seal portion) of the gas barrier laminate to form the body into a cylindrical shape. In this case, since the outermost layer is not required to serve as a sealant layer, a high density polyethylene or polypropylene resin can be selected as a material of the outermost layer, and thus durability and decorativeness of the tube container can be enhanced. Furthermore, since sealant layers generally require a thickness of 60 μm to 100 μm, use of a substrate (with a thickness of about 20 μm to 30 μm), which is not a sealant layer, as an outermost layer can significantly reduce the amount of plastic used for the entire container. In the structure in which the first resin layer is used as an innermost sealant layer, the substrate layer can be used as an outermost layer without providing the second resin layer. Accordingly, the amount of plastic used for the entire tube container can be further reduced. In this case, a print layer may be formed on the substrate, which is an outermost layer, and protected by an overprint varnish. The tube container which is not provided with a sealant layer as an outermost layer will have a body in which the laminate is thinner than that of the tube container provided with sealant layers on both surfaces. Therefore, the stress applied to the gas barrier layer of the former tube container when deformed is considered to be relatively larger; however, the laminate of the present invention can be preferably used due to having gas barrier properties and retaining them at a high level even after being deformed. In order that the contents can be completely squeezed out, the tube container can have a shape in which the shoulder portion is vertically provided with respect to the body without being tapered. If the substrate layer and the sealant layer of the gas barrier laminate are made of the same resin, recyclability can be improved. There is no particular limitation in the materials of the discharge portion and the cap of the tube container; however, if the same resin as that of the substrate layer is used, recyclability can be further improved. In order to seal the tube container until the initial opening, an easy-to-separate film for closing the opening may be bonded to the spout portion from outside. The gas barrier laminate of the present embodiment may be combined with an easy-to-separate sealant for use as such a lid for sealing the opening.

EXAMPLES

The present invention will be described below in more detail by way of examples, but the present invention should not be construed as being limited to these examples.

Preparation of Coating Liquid (1)

A solution was prepared by mixing tetraethoxysilane (product name: KBEO4, solid content: 100%, manufactured by Shin-Etsu Chemical Co., Ltd., which may be termed TEOS hereinafter), methanol (Kanto Kagaku), and 0.1N hydrochloric acid (Kanto Kagaku) at a weight ratio of 45/15/40, and hydrolyzing the mixture. This solution was mixed with a 5% aqueous solution of a polyvinyl alcohol (product name: Kuraray POVAL 60-98 manufactured by Kuraray Co., Ltd., which may be termed PVA hereinafter) to obtain a coating liquid (1). In this case, the solutions were mixed so that a content ratio a/b between the content of the silicon atoms (mass part a) and the content of PVA (mass part b) in the coating liquid (1) would be 40/60 in mass ratio.

It should be noted that the content of the silicon atoms was calculated by dividing the weight of TEOS by the molar mass of TEOS, and multiplying this by the mass (atomic weight of 28.1) of the silicon atoms (Si). Specifically, the content of the silicon atoms in 100 g of TEOS was 13.5 g.

Preparation of Coating Liquid (2)

A coating liquid (2) was obtained as in the process of obtaining the coating liquid (1) except that the solutions were mixed so that the content ratio a/b would be 3/97.

Preparation of Coating Liquid (3)

A coating liquid (3) was obtained as in the process of obtaining the coating liquid (1) except that the solutions were mixed so that the content ratio a/b would be 20/80.

Preparation of Coating Liquid (4)

A coating liquid (4) was obtained as in the process of obtaining the coating liquid (1) except that the solutions were mixed so that the content ratio a/b would be 15/85.)

Preparation of Coating Liquid (5)

A coating liquid (5) was obtained as in the process of obtaining the coating liquid (1) except that the solutions were mixed so that the content ratio a/b would be 5/95.

Preparation of Coating Liquid (6)

A coating liquid (6) was obtained as in the process of obtaining the coating liquid (1) except that the solutions were mixed so that the content ratio a/b would be 45/55.

Preparation of Coating Liquid (7)

A coating liquid (7) was obtained as in the process of obtaining the coating liquid (1) except that the solutions were mixed so that the content ratio a/b would be 1/99.

Preparation of Coating Liquid (8)

A coating liquid (8) was obtained as in the process of obtaining the coating liquid (1) except that the solutions were mixed so that the content ratio a/b would be 70/30.

Preparation of coating liquid (9)

A coating liquid (9) was obtained as in the process of obtaining the coating liquid (1) except that the solutions were mixed so that the content ratio a/b would be 50/50.

Preparation of Gas Barrier Laminate

Example 1

Using a biaxially stretched polypropylene film (OPP film, product name: Pyrene P2161 manufactured by Toyobo Co., Ltd., film thickness: 20 µm) as a substrate, a silicon oxide was vapor deposited on the corona treated surface of the film using an electron beam vacuum vapor deposition method to form a vapor deposited silicon oxide film with a thickness of 25 µm as a metal oxide layer. Furthermore, the coating liquid (1) was applied using a bar coating method so that the cured thickness would be 1.5 µm, followed by drying at 60° C. for 1 minute in an oven, to obtain a gas barrier laminate.

Example 2

Using a biaxially stretched polypropylene film (OPP film, product name: Pyrene P2161 manufactured by Toyobo Co., Ltd., film thickness: 20 µm) as a substrate, a polyester resin was applied in an amount of 0.1 g/m$^2$ as an anchor coat layer on the corona treated surface of the film. Subsequently, silicon oxide was vapor deposited on the anchor coat layer using an electron beam vacuum vapor deposition method to form a vapor deposited silicon oxide film with a thickness of 25 nm as a metal oxide layer. Furthermore, the coating liquid (2) was applied using a bar coating method so that the cured thickness would be 0.8 µm, followed by drying at 60° C. for 1 minute in an oven to obtain a gas barrier laminate.

Example 3

A gas barrier laminate was obtained as in the process of Example 1 except that the coating liquid (3) was used instead of the coating liquid (1).

Example 4

A gas barrier laminate was obtained as in the process of Example 2 except that the coating liquid (4) was applied instead of the coating liquid (2) so that the cured thickness would be 2.0 μm.

Example 5

A gas barrier laminate was obtained as in the process of Example 2 except that the coating liquid (4) was used instead of the coating liquid (2).

Example 6

A gas barrier laminate was obtained as in the process of Example 2 except that the coating liquid (5) was used instead of the coating liquid (2).

Example 7

A gas barrier laminate was obtained as in the process of Example 2 except that the coating liquid (6) was used instead of the coating liquid (2).

Comparative Example 1

A gas barrier laminate was obtained as in the process of Example 2 except that the coating liquid (7) was used instead of the coating liquid (2).

Comparative Example 2

A gas barrier laminate was obtained as in the process of Example 2 except that the coating liquid (8) was applied instead of the coating liquid (2) so that the cured thickness would be 1.5 μm.

Comparative Example 3

A gas barrier laminate was obtained as in the process of Example 2 except that the coating liquid (9) was used instead of the coating liquid (2).

Preparation of Packaging Material (Laminate Film)

An unstretched polypropylene film (CPP, product name: Torayfan NO ZK207 manufactured by Toray Advanced Film Co., Ltd., film thickness: 60 μm) was laminated on the gas barrier cover layer of each of the gas barrier laminates obtained in Examples 1 to 7 and Comparative Examples 1 to 3 via a two-part type adhesive (product name: A525/A52 manufactured by Mitsui Chemicals, Inc.) using a dry lamination method so that the application quantity after drying would be 3 g/m² to prepare a packaging material (laminate film).

Evaluation

Retort Sterilization Treatment

Using the packaging materials obtained from the gas barrier laminates of Examples 1 to 7 and Comparative Examples 1 to 3, pouches with a size of 210 mm long by 150 mm wide having seal portions at four sides were prepared. Also, sample pouches used for evaluating the results of physical durability tests following retort sterilization treatment were prepared with a size of 315 mm long by 230 mm wide. Both types of pouches were filled with water as contents and subjected to retort sterilization treatment at 121° C. for 30 minutes.

Physical Durability Tests

The packaging materials obtained from the gas barrier laminates of Examples 1 to 7 and Comparative Examples 1 to 3 and upper surfaces of the pouches subjected to retort sterilization treatment were each cut to a size of 295 mm long by 210 mm wide for use as samples. Each sample was loaded on a fixed head of a Gelbo Flex tester manufactured by Tester Sangyo Co., Ltd. so as to have a cylindrical shape of 87.5 mm diameter by 210 mm length. The sample was subjected to flexing, with both ends thereof held at an initial gripping interval of 175 mm therebetween, by applying a 440° twist with an 87.5 mm stroke, and repeating this motion 5 times at a rate of 40 reciprocations per minute.

Measurements of Oxygen Permeability

Oxygen permeability was measured for the gas barrier laminates, the samples subjected to retort sterilization treatment, the samples subjected to physical durability tests, and the samples subjected to abusive tests following retort sterilization treatment obtained from Examples 1 to 7 and Comparative Examples 1 to 3, using an oxygen permeability tester (OX-TRAN2/20 manufactured by Modern Controls Inc.) under conditions of 30° C. and 70% relative humidity. The measurement results are shown in Table 1

TABLE 1

| | Anchor coat layer | Gas barrier cover layer a/b | Thickness (μm) | Untreated | After retort treatment | After physical durability tests | After retort and physical durability tests |
|---|---|---|---|---|---|---|---|
| Ex. 1 | Absent | 40/60 | 1.5 | 1.2 | 2.8 | 5.1 | 6.8 |
| Ex. 2 | Present | 3/97 | 0.8 | 0.1 | 2.6 | 0.5 | 4.5 |
| Ex. 3 | Absent | 20/80 | 1.5 | 1.0 | 2.0 | 1.3 | 6.1 |
| Ex. 4 | Present | 15/85 | 2.0 | 0.2 | 0.5 | 0.2 | 3.4 |
| Ex. 5 | Present | 15/85 | 0.8 | 0.2 | 0.3 | 0.3 | 2.9 |
| Ex. 6 | Present | 5/95 | 0.8 | 0.1 | 0.1 | 0.3 | 2.5 |
| Ex. 7 | Present | 45/55 | 0.8 | 0.3 | 0.5 | 7.9 | 9.3 |
| CEx. 1 | Present | 1/99 | 0.8 | 0.4 | *1 | 6.9 | *1 |

TABLE 1-continued

|  | Anchor coat layer | Gas barrier cover layer | | Oxygen permeability | | | |
|---|---|---|---|---|---|---|---|
|  |  | a/b | Thickness (μm) | Untreated | After retort treatment | After physical durability tests | After retort and physical durability tests |
| CEx. 2 | Present | 70/30 | 1.5 | 0.1 | 0.3 | 13.9 | 15.7 |
| CEx. 3 | Present | 50/50 | 0.8 | 0.3 | 0.6 | 10.3 | 11.1 |

Delaminated;
Ex.: Example;
CEx.: Comparative Example

As shown in Table 1, the gas barrier laminates of Examples 1 to 7 could achieve good gas barrier properties after retort sterilization treatment or physical durability tests even when OPP was used as a substrate.

In contrast, the gas barrier laminate of Comparative Example 1 with a low ratio a/b suffered delamination after retort treatment, and therefore, oxygen permeability could not be measured. Also, in Comparative Examples 2 and 3 with a high ratio a/b, oxygen permeability became high after physical durability tests, and therefore, sufficient gas barrier properties could not be achieved.

Industrial Applicability

According to the present embodiment, a gas barrier laminate retaining good gas barrier properties after physical durability tests or retort sterilization treatment can be provided, even when a material which is poor in gas barrier properties, such as a single plastic film of a polyolefin or the like including a biaxially stretched polypropylene, for example, is used as a substrate of the gas barrier laminate.

[Reference Signs List] 1 . . . Substrate layer; 2 . . . Metal oxide layer; 3 . . . Gas barrier cover layer; 4 . . . Anchor coat layer; 10, 20 . . . Gas barrier laminate; 100 . . . Spouted packaging bag; 104 . . . Spout; 105 . . . Straw; 140 . . . Packaging bag; 500 . . . Tube container; 510 . . . Body; 520 . . . Discharge portion; 530 . . . Cap.

What is claimed is:

1. A gas barrier laminate, consisting of:
a substrate layer consisting of a polyolefin,
a metal oxide layer directly on the substrate layer,
a gas barrier cover layer directly on the metal oxide layer,
an adhesive layer directly on the gas barrier cover layer; and
a sealant layer directly on the adhesive layer,
wherein
the gas barrier cover layer contains a silicon alkoxide or a hydrolysate thereof and a water-soluble polymer, and a content ratio a/b between a content of silicon atoms of the silicon alkoxide or a hydrolysate thereof (mass part a) and a content of the water-soluble polymer (mass part b) is 3/97 or more and 45/55 or less in mass ratio.

2. The gas barrier laminate of claim 1, wherein the content ratio a/b is 5/95 or more in mass ratio.

3. The gas barrier laminate of claim 1, wherein the gas barrier cover layer has a thickness of 0.1 μm or more and 1 μm or less.

4. The gas barrier laminate of claim 3, wherein the substrate layer is a biaxially stretched polyolefin film having a thickness from 3 μm to 100 μm; the metal oxide layer is a layer consisting of silicon oxide and having a thickness from 3 nm to 100 nm; the silicon alkoxide is tetraethoxysilane and the water soluble polymer is polyvinyl alcohol.

5. The gas barrier laminate of claim 4, wherein the biaxially stretched polyolefin film is a biaxially stretched polypropylene film.

6. A packaging bag comprising the gas barrier laminate of claim 1.

7. A tube container comprising the gas barrier laminate of claim 1.

8. The gas barrier laminate of claim 1, wherein the substrate layer is a biaxially stretched polyolefin film having a thickness from 3 μm to 100 μm; the metal oxide layer is a layer consisting of silicon oxide and having a thickness from 3 nm to 100 nm; the silicon alkoxide is tetraethoxysilane and the water soluble polymer is polyvinyl alcohol.

9. The gas barrier laminate of claim 8, wherein a thickness of the gas barrier cover layer is from 0.8 μm to 2.0 μm.

10. The gas barrier laminate of claim 8, wherein the biaxially stretched polyolefin film is a biaxially stretched polypropylene film.

11. A gas barrier laminate, consisting of:
a substrate layer consisting of a polyolefin,
an anchor layer directly on the substate layer;
a metal oxide layer directly on the anchor layer,
a gas barrier cover layer on the metal oxide layer,
an adhesive layer directly on the gas barrier cover layer; and
a sealant layer directly on the adhesive layer,
wherein
the gas barrier cover layer contains a silicon alkoxide or a hydrolysate thereof and a water-soluble polymer, and a content ratio a/b between a content of silicon atoms of the silicon alkoxide or a hydrolysate thereof (mass part a) and a content of the water-soluble polymer (mass part b) is 3/97 or more and 45/55 or less in mass ratio.

12. The gas barrier laminate of claim 11, wherein the content ratio a/b is 5/95 or more in mass ratio.

13. The gas barrier laminate of claim 11, wherein the gas barrier cover layer has a thickness of 0.1 μm or more and 1 μm or less.

14. The gas barrier laminate of claim 13, wherein the substrate layer is a biaxially stretched polyolefin film having a thickness from 3 μm to 100 μm; the metal oxide layer is a layer consisting of silicon oxide and having a thickness from 3 nm to 100 nm; the silicon alkoxide is tetraethoxysilane and the water soluble polymer is polyvinyl alcohol.

15. The gas barrier laminate of claim 14, wherein the biaxially stretched polyolefin film is a biaxially stretched polypropylene film.

16. A packaging bag comprising the gas barrier laminate of claim 11.

17. A tube container comprising the gas barrier laminate of claim 11.

18. The gas barrier laminate of claim 11, wherein the substrate layer is a biaxially stretched polyolefin film having a thickness from 3 μm to 100 μm; the metal oxide layer is a layer consisting of silicon oxide and having a thickness from 3 nm to 100 nm; the silicon alkoxide is tetraethoxysilane and the water soluble polymer is polyvinyl alcohol.

19. The gas barrier laminate of claim 18, wherein a thickness of the gas barrier cover layer is from 0.8 μm to 2.0 μm.

20. The gas barrier laminate of claim 18, wherein the biaxially stretched polyolefin film is a biaxially stretched polypropylene film.

* * * * *